(12) United States Patent
Sen et al.

(10) Patent No.: US 11,427,746 B2
(45) Date of Patent: Aug. 30, 2022

(54) POLYSACCHARIDE LOST CIRCULATION MATERIALS FOR WELLBORE OPERATIONS

(71) Applicant: Halliburton Energy Services, Inc., Houston, TX (US)

(72) Inventors: Tamal Kumar Sen, Kolkata (IN); Sandip Prabhakar Patil, Pune (IN); Sheetal Singh, Pune (IN)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/500,063

(22) PCT Filed: Nov. 9, 2018

(86) PCT No.: PCT/US2018/060007
§ 371 (c)(1),
(2) Date: Oct. 1, 2019

(87) PCT Pub. No.: WO2020/096615
PCT Pub. Date: May 14, 2020

(65) Prior Publication Data
US 2021/0348047 A1    Nov. 11, 2021

(51) Int. Cl.
| | | |
|---|---|---|
| *C09K 8/487* | (2006.01) | |
| *C04B 14/06* | (2006.01) | |
| *C04B 14/10* | (2006.01) | |
| *C04B 24/38* | (2006.01) | |
| *C04B 28/02* | (2006.01) | |
| *C09K 8/42* | (2006.01) | |

(Continued)

(52) U.S. Cl.
CPC .............. *C09K 8/487* (2013.01); *C04B 14/062* (2013.01); *C04B 14/10* (2013.01); *C04B 24/38* (2013.01); *C04B 28/02* (2013.01); *C09K 8/426* (2013.01); *C04B 2103/20* (2013.01); *C04B 2103/44* (2013.01)

(58) Field of Classification Search
CPC ...... C09K 8/487; C09K 8/426; C04B 14/062; C04B 14/10; C04B 24/38; C04B 28/02; C04B 8/426
See application file for complete search history.

(56) References Cited

U.S. PATENT DOCUMENTS 3,208,524 A * 9/1965 Horner .................. C09K 8/512
166/294
5,372,732 A   12/1994 Harris et al.
(Continued)

OTHER PUBLICATIONS

International Patent Application No. PCT/US2018/060007, International Search Report and Written Opinion dated Aug. 7, 2019, 18 pages.

*Primary Examiner* — Crystal J. Lee
(74) *Attorney, Agent, or Firm* — Kilpatrick Townsend & Stockton LLP

(57) ABSTRACT

Described herein are plugging materials with polysaccharides that can be used in wellbore operations. A plugging material can include hydraulic cement, amorphous silica, polysaccharides, a retarder, clay, and an aqueous base, where the material is injectable into a wellbore. The polysaccharides can be cross-linked with borate. The retarder can be at least one of an organo phosphoric acid, a modified sulfonated styrene-maleic anhydride polymer, lignosulfonate, or a polyacrylic acid.

20 Claims, 15 Drawing Sheets

(51) Int. Cl.
*C04B 103/20* (2006.01)
*C04B 103/44* (2006.01)

(56) References Cited

U.S. PATENT DOCUMENTS

| | | | |
|---|---|---|---|
| 5,919,739 A | 7/1999 | Sunde et al. | |
| 6,098,712 A | 8/2000 | Burts, Jr. | |
| 8,685,903 B2 | 4/2014 | Ravi et al. | |
| 2008/0300149 A1* | 12/2008 | Reddy | C04B 24/168 |
| | | | 507/110 |
| 2010/0258312 A1* | 10/2010 | Brenneis | C09K 8/426 |
| | | | 166/293 |
| 2016/0160109 A1 | 6/2016 | Patil et al. | |
| 2016/0186045 A1 | 6/2016 | Maguire-boyle et al. | |

* cited by examiner

POLYSACCHARIDE LOST CIRCULATION MATERIALS FOR WELLBORE OPERATIONS

FIELD

The present disclosure relates to plugging materials and methods for using plugging materials in a wellbore. The present disclosure relates more particularly to lost circulation materials that include cross-linked polysaccharides that can be used in wellbore operations.

BACKGROUND

During drilling operations, a drilling fluid can be used to cool the drilling bit, control pressure within the wellbore, and suspend and transport drill cuttings from the wellbore to the surface. The drilling fluid can be circulated downwardly through the interior of a drill pipe and upwardly through the annulus, which is located between the exterior of the pipe and the wall of the subterranean formation. Once a casing is in place, cement slurry may be positioned in the annulus to attach the casing to the walls of the wellbore and seal the annulus. During drilling and cementing, permeable zones in the subterranean formation may be encountered. The permeable zones may be, for example, vugs, voids, naturally occurring fractures, or induced fractures that occur when weak zones have fracture gradients exceeded by the hydrostatic pressure of the drilling fluid or the cement slurry. These permeable zones may result in the loss of the drilling fluid circulation in the wellbore during the drilling operation and can cause the drilling operation to be delayed. During the cementing operation, a portion of the cement slurry may also be lost to the permeable zones in the subterranean formation, which may not permit the cement slurry to fill the annulus completely, and can lead to improper zonal isolation or the strength of the cement may be compromised by dehydration of the cement, causing additional delays.

Plugging materials can be used to seal the permeable zones in the subterranean formation and to prevent the loss of circulation of drilling fluids and cement slurries during the wellbore creation. Temperature and pressure conditions within the wellbore can impact the effectiveness of plugging materials. At temperatures above a bottomhole static temperature (BHST) of 230° F., it is difficult to successfully seal the permeable zones within the wellbore and prevent fluid loss without hampering other fluid properties within the wellbore with conventional materials. Plugging materials that can successfully seal permeable zones where the temperatures within the loss zones exceed BHST 230° F. are desired and could open new markets within the oil and gas industries.

DETAILED DESCRIPTION

Certain aspects and features of the present disclosure relate to plugging materials and methods for using plugging materials in a wellbore. In some examples, the plugging material can include a lost circulation material (LCM) that can be used in wellbore operations. In some examples, the LCM can include a cross-linked polysaccharide.

Plugging materials can include slurries and other thixotropic fluids. Thixotropic behavior can be utilized in drilling operations to reduce or eliminate undesired losses, especially in a weak subterranean formation. Plugging materials, such as a lost-circulation material (LCM), can be injected into a wellbore to bond to a subterranean formation, seal the permeable zones in the wellbore, and prevent the loss of circulation of drilling fluids and cement slurries through permeable zones within the formation.

Figure 1:
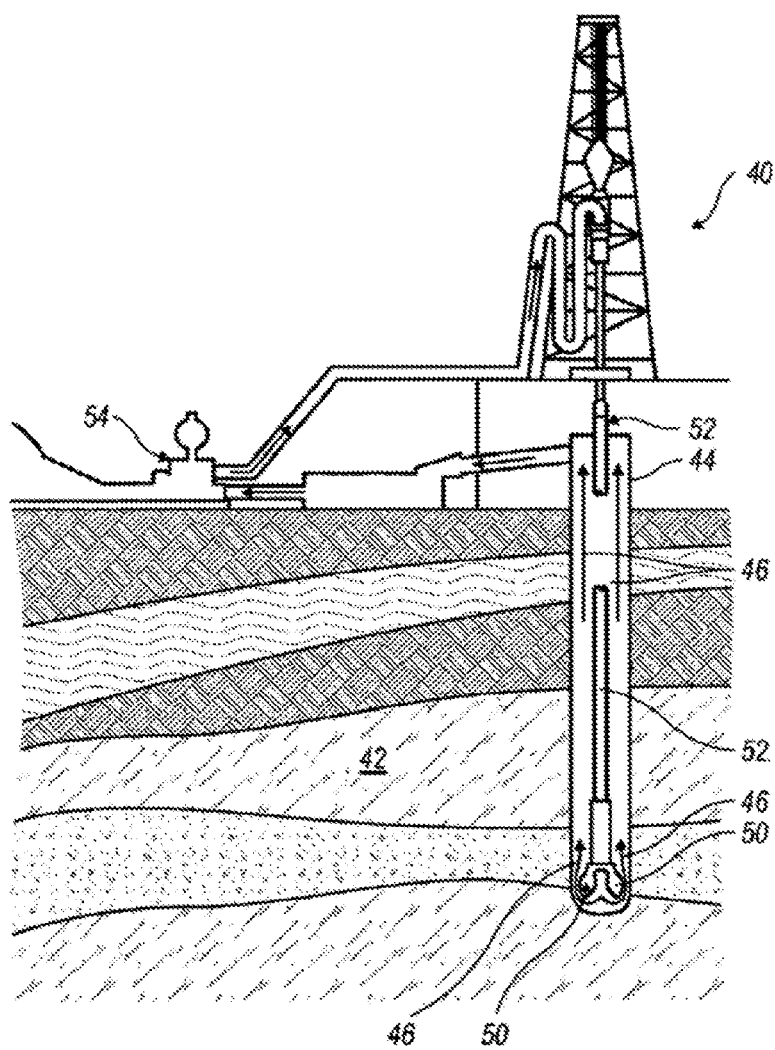
FIG. 1 is an illustrative schematic of the drilling of a wellbore through a subterranean formation during which a plugging material is employed to seal the formation to prevent the lost-circulation of the drilling fluid according to one example of the present disclosure.

FIG. 1 illustrates a wellbore 44 being drilled through a subterranean formation 42, during which a plugging material may be used to seal the subterranean formation 42. A drill rig 40 can be used for drilling the wellbore 44. A drill bit 50 may be mounted on the end of a drill string 52 that includes multiple sections of drill pipe. The wellbore 44 may be drilled by using a rotary drive at the surface to rotate the drill string 52 and to apply torque and force to cause the drill bit 50 to extend through wellbore 44. The drilling fluid may be displaced through the drill string 52 using one or more pumps 54. The drilling fluid may be circulated past the drill bit 50 and returned to the surface through the annulus of wellbore 44, as indicated by arrows 46, thereby removing drill cuttings (e.g., material such as rock generated by the drilling) from the wellbore 44. Although not shown, additional conduits besides drill string 52 may also be disposed within wellbore 44.

The subterranean formation 42 may contain permeable zones through which the drilling fluid may migrate from wellbore 44 into the subterranean formation 42. These permeable zones may be, for example, fractures, fissures, streaks, voids, vugs, and the like. The presence of such permeable zones in the subterranean formation 42 may cause the circulation of the drilling fluid in wellbore 44 to be lost such that the fluid does not flow back to the surface of the earth. To maintain good circulation of the drilling fluid in wellbore 44, a plugging material may be passed into wellbore 44 and allow to set downhole. The strength of the plugging material may increase with time after placement downhole.

While co-mingling or meeting with the favorable downhole conditions, the free flowing plugging material can set irreversibly hard into permeable zones. The favorable conditions can include, for example, pH, salinity, water, temperature, and shear rate. And, the plugging material may rapidly develop compressive strength. The plugging material can quickly set into a rigid sealing mass that is substantially impermeable to fluid (i.e., no fluid or only a small amount of fluid can pass through the mass). After setting, the plugging material may not be able to be washed out of the permeable zones, and the circulation of the drilling fluid through wellbore 44 may be resumed without concern that the drilling fluid may escape from wellbore into the subterranean formation.

After drilling the wellbore 44 is completed, drill string 52 and drill bit 50 may be removed from wellbore 44. And a casing can be positioned in wellbore 44. Primary cementing may then be performed by pumping a cement slurry down the casing and into the annulus between the casing and the wall of wellbore 44. The set-plugging material can block the permeable zones and prevent the cement slurry from flowing into the subterranean formation. As a result, the hydrostatic pressure of the cement slurry may be maintained such that the slurry returns to the surface and forms a relatively strong cement column in the annulus of the wellbore.

The strength of the LCM can impact the ability of the particular material to seal the permeable zones within a wellbore and prevent fluid loss. The selection of a LCM may depend on the geological makeup of the subterranean formation. By selecting a plugging material with improved performance to effectively plug the permeable zones within the wellbore at high temperature, wellbore operations can expand to geographic regions and subterranean formation types that would otherwise be inoperable.

In some examples, LCM for use in sealing a subterranean formation can include for example, hydraulic cements, diesel oil bentonite mud mixes (DOB), diesel oil bentonite mud mixes with cement added to increase strength (DOBC), sorrel cement mixed in viscosified oil (clay and viscosifier), resins, and thixotropic slurries. In some examples, the clay may include a magnesium based nano clay.

In some examples, a LCM can include hydraulic cement, amorphous silica, polysaccharides, a retarder, clay and an aqueous base. In certain examples, the polysaccharides can be present in an amount of about 1 percent by weight of cement (% bwoc) to about 10% bwoc. For example, the LCM may include about 3% polysaccharides % bwoc.

In some examples, the polysaccharides can be cross-linked. In certain examples, the polysaccharides can be cross-linked with borate. Under certain conditions, the bonds crosslinking the polysaccharides to the borate can break, freeing the borate and polysaccharide to react. The temperatures within a wellbore can exceed 200° F., often reaching a bottomhole static temperature (BHST) of 230° F. or more. The crosslinking of the polysaccharide and borate of the LCM described herein can break around 160° F.-170° F. The freed borate can desirably increase the thickening time of the cement system, while the polysaccharide can react to improve the gel strength build up without negative impacts to surface mixing. Breaking the crosslinking bonds can enable the material described herein to be effective to temperatures greater than a BHST of 230° F. In some cases, the material described herein can be utilized at a BHST of 340° F., or more.

Various types of cement and retarders can be utilized in the LCM described herein. In some examples, the retarder can include at least one of an organo phosphoric acid, a modified sulfonated styrene-maleic anhydride polymer, lignosulfonate, or a polyacrylic acid. In certain examples, the retarder can be present in an amount of about 2% bwoc to about 15% bwoc (e.g., 5% bwoc, 7% bwoc, or 12% bwoc). For example, the LCM may include about 0.5 gallons of retarder per sack of cement (gal/sk). In other examples, the LCM may include about 0.9 gallons of retarder per sack of cement. In some examples, the hydraulic cement can include at least one of Portland cement, a pozzolana cement, a gypsum cement, a high alumina content cement, a slag cement, high magnesia content cement, shale cement, acid or base cement, fly ash cement, a zeolite cement system, a kiln dust cement system, microfine cement, metakaolin, or pumice.

The LCM can also include other additives. For example, the LCM can include at least one of resins, latex, stabilizers, pozzolans, microspheres, aqueous superabsorbers, viscosifying agents, suspending agents, dispersing agents, extenders, salts, accelerants, surfactants, stimulating agents, defoamers, settling-prevention agents, weighting materials, elastomers, vitrified shale, expansion additives, gas migration control additives, formation conditioning agents, acids, or bases.

The aqueous base can include at least one of fresh water, brackish water, or saltwater. In some cases, the aqueous base may be pH adjusted to improve performance. For example, sodium hydroxide may be added to the aqueous base to adjust the pH. In some examples, the LCM can have a density of less than 12 pounds per gallon (lb/gal), for example, the material may have a density of about 10.5 lb/gal.

Some factors considered when selecting a LCM include compressive strength, thickening time, and gel strength. Compressive strength of a material can be determined over time as the material cures under downhole temperature and pressure conditions using ultrasonic cement analyzers (UCA). Thickening time is a measure of the time that a cement slurry remains in a fluid state and is capable of being pumped. Thickening time is generally assessed under downhole conditions as a function of consistency or pumpability. Gel strength is a measure of shear stress at a low shear rate after a material has set quiescently for a set period of time. Two common time measurements for gel strength determination are ten minutes/ten seconds at 180 F at atmospheric pressure and another is gel strength measurement at downhole condition using MACS-II.

In some examples, the material described herein can have an ultimate compressive strength over 100 psi at conditions of 340° F. The material can transition from 100 lbf/100 ft$^2$ to 500 lbf/100 ft$^2$ in 30 minutes or less, at 320° F. and 5000 psi. In some cases, the material can have a thickening time to 70 Bc at 320° F. and 5000 psi of at least two hours. For example, the thickening time can be two hours, three hours, four hours, or more. In certain examples, the material can have a 10-second static gel strength of at least 6 lbf/100 ft² at 180° F. In other examples, the material can have a 10-second static gel strength of at least 15 lbf/100 ft² at 180° F. In some examples, the material can have a 10-minute static gel strength of at least 14 lbf/100 ft² at 180° F. In certain examples, the material can have a 10-minute static gel strength of at least 45 lbf/100 ft² at 180° F.

The material may be positioned in the wellbore to substantially seal one or more permeable or fracture zones in the wellbore, and prevent a loss of circulation of drilling fluids and cement slurries through the permeable zones. In certain examples, the material may be positioned in a lost circulation zone of a wellbore. In some examples, methods of using a plugging material can include providing a material comprising hydraulic cement, amorphous silica, polysaccharides, a retarder, clay and an aqueous base; contacting a lost circulation zone in a wellbore with the material; and allowing the material to set in the lost circulation zone. The retarder can include at least one of an organo phosphoric acid, a modified sulfonated styrene-maleic anhydride polymer, lignosulfonate, or a polyacrylic acid.

Figure 2:
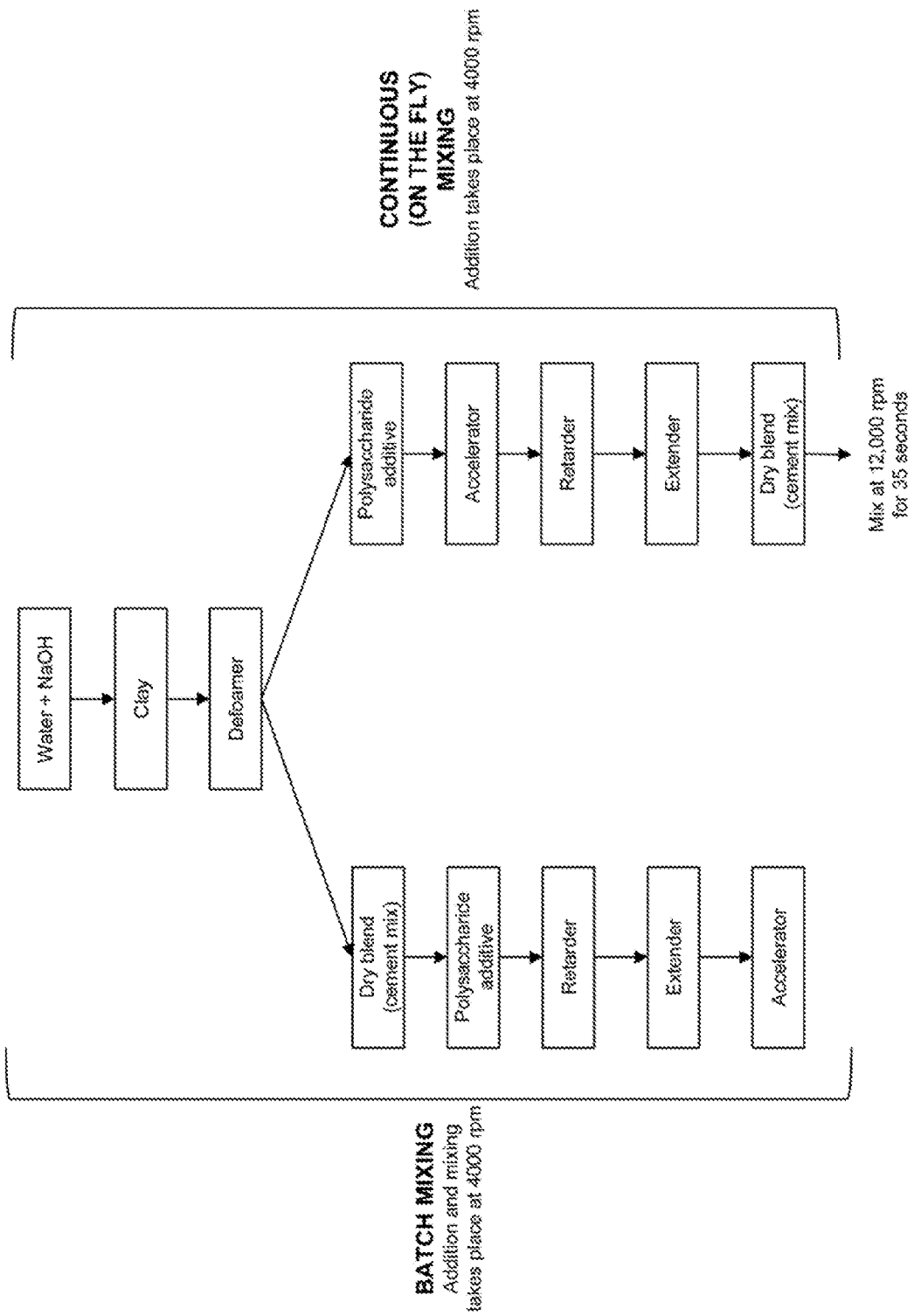
FIG. 2 is a block diagram showing mixing of plugging materials according to one example of the present disclosure.

In some examples, the material described herein can be prepared using a batch mixing process. In other examples, the material can be prepared in a continuous manner or "on the fly" at the wellbore. FIG. 2 distinguishes batch mixing from mixing for continuous operation "on the fly" at the wellbore. The method can include contacting a pH-adjusted aqueous base and a clay to form a mixture; adding a defoamer; adding a borate cross-linked polysaccharide; adding an accelerator; adding a retarder; adding a dry blend comprising hydraulic cement and amorphous silica; and agitating the mixture with a high shear mixer. Optionally, the method can include adding an extender after the retarder. Optionally, the dry blend can further include a stabilizing agent. The retarder can include at least one of an organo phosphoric acid, a modified sulfonated styrene-maleic anhydride polymer, lignosulfonate, or a polyacrylic acid. Optionally, the method can include agitating the mixture during each addition.

Figure 3:
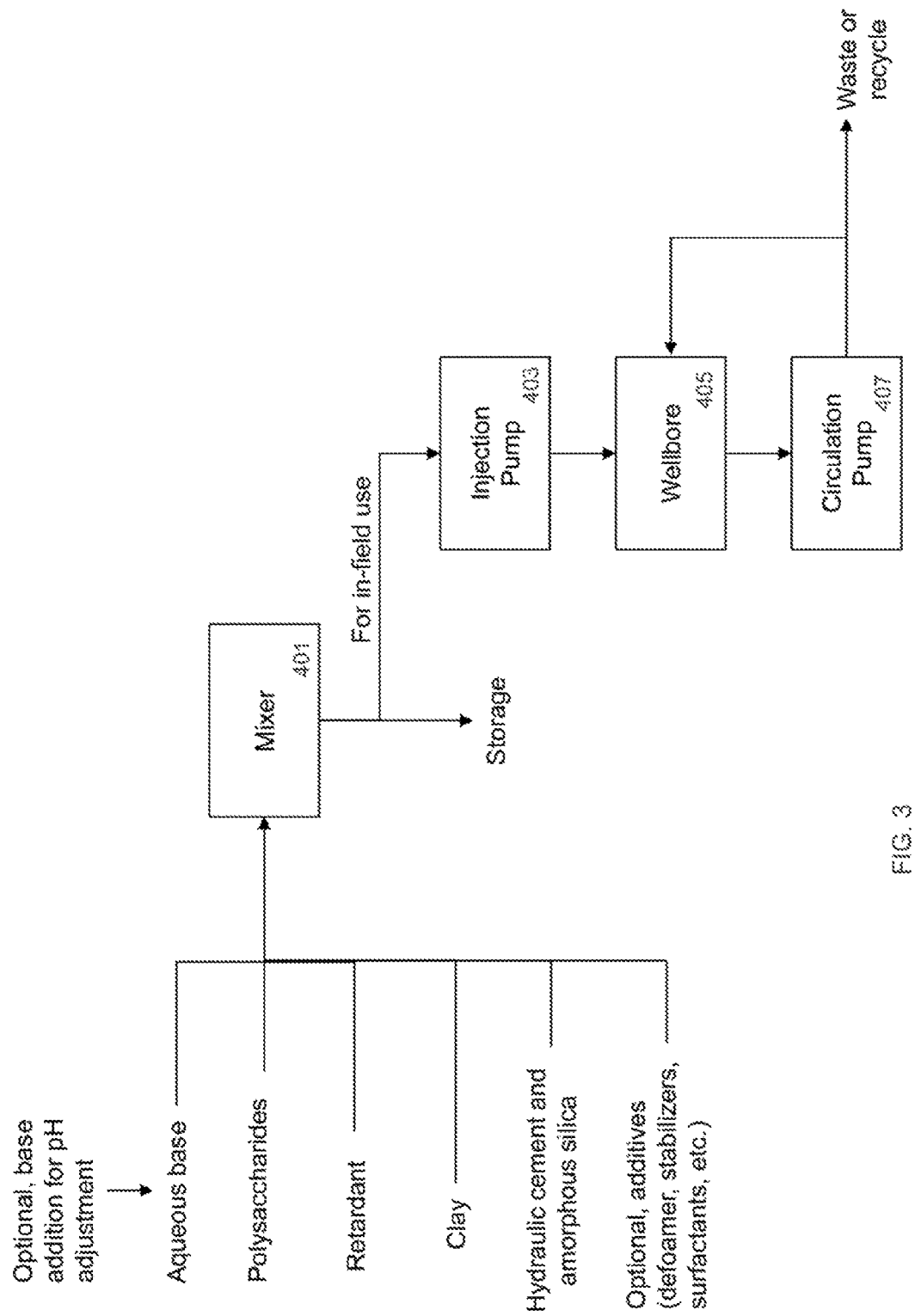
FIG. 3 is a block diagram showing plugging materials used in wellbores according to one example of the present disclosure.

In some cases, systems to treat a wellbore with a plugging may be configured. As shown in FIG. 3, a system may include an injection pump 403 to inject the plugging material into a wellbore 405. A system can include a circulation pump 407 to circulate a plugging material within a wellbore. Optionally, a system can include a mixer 401 that contacts at least a cement blend, retarder, polysaccharides, clay, with an aqueous base to form a plugging material.

Example 1

Two batches of LCM slurry were prepared. The components listed in Table 1 were mixed using a Warning blender at 4000 rpm to form the respective example slurries. Slurry 1 included Suspend HT™, an additive with polysaccharides crosslinked with borate.

TABLE 1

| Component | Unit | Slurry 1 | Slurry 2 |
|---|---|---|---|
| Class G Cement | % bwoc | 100 | 100 |
| Silicalite ™ (amorphous silica) | % bwoc | 32 | 32 |
| Suspend HT ™ (polysaccharide additive) | % bwoc | 3 | — |

TABLE 1-continued

| Component | Unit | Slurry 1 | Slurry 2 |
|---|---|---|---|
| Mirco Matrix ® Cement Retarder | gal/sk | 0.9 | 0.9 |
| Econolite ™ Liquid (accelerator) | gal/sk | 0.3 | 0.3 |
| FDP-984 (clay) | % bwow | 1.5 | 1.5 |
| Water | gal/sk | 34 | 34 |
| D-Air 3000L ™ (defoamer) | gal/sk | 0.1 | 0.1 |
| NaOH | % bwow | 0.3 | 0.3 |

The slurries were tested for rheological behavior and gel strength using a FANN® rheometer using a Fann Yield Stress Adapter (FYSA). All tests were performed using API RP 10B-2. The test results are summarized in Table 2.

TABLE 2

| Rheology on FYSA | Slurry 1 80° F. | Slurry 1 180° F. | Slurry 2 80° F. | Slurry 2 180° F. |
|---|---|---|---|---|
| 300 | 10 | 18 | 10 | 13 |
| 200 | 6 | 14 | 6 | 10 |
| 100 | 4 | 12 | 4 | 9 |
| 6 | 4 | 11 | 4 | 8 |
| 3 | 4 | 11 | 4 | 8 |
| 10-sec. gel strength (lbf/100 ft²) | 10 | 15 | 10 | 10 |
| 10-min gel strength (lbf/100 ft²) | 30 | 45 | 34 | 15 |

The 10-second gel strength of Slurry 1 at 80° F. was similar to that of Slurry 2, while Slurry 1 was greater than Slurry 2 at 180° F. However, the 10-minute gel strength of Slurry 1 at 180° F. was three times greater than that of Slurry 2.

Figure 4:
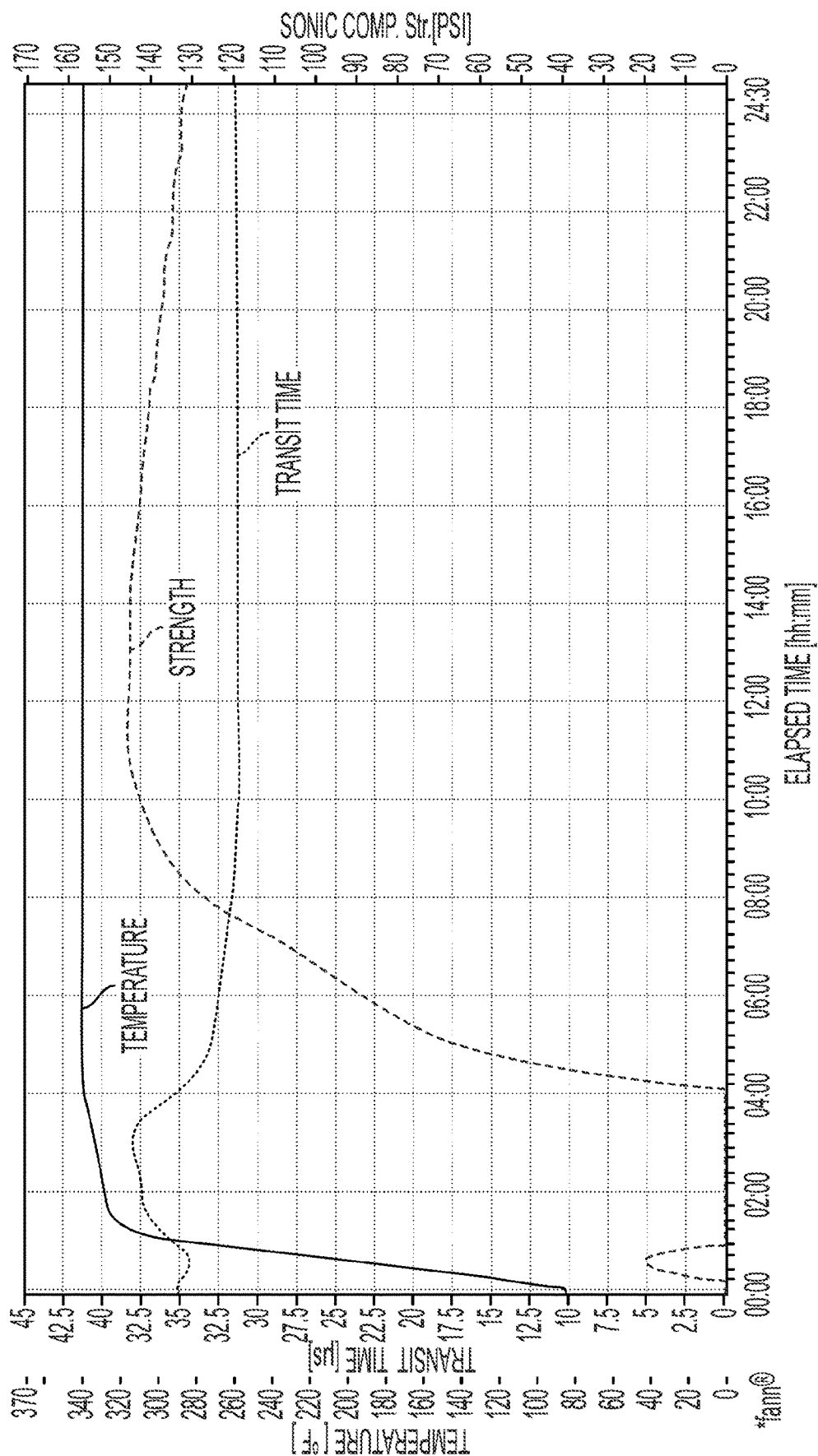
FIG. 4 is a chart of compressive strength with respect to temperature and sonic transit time of a plugging material, according to one example of the present disclosure.
Figure 5:
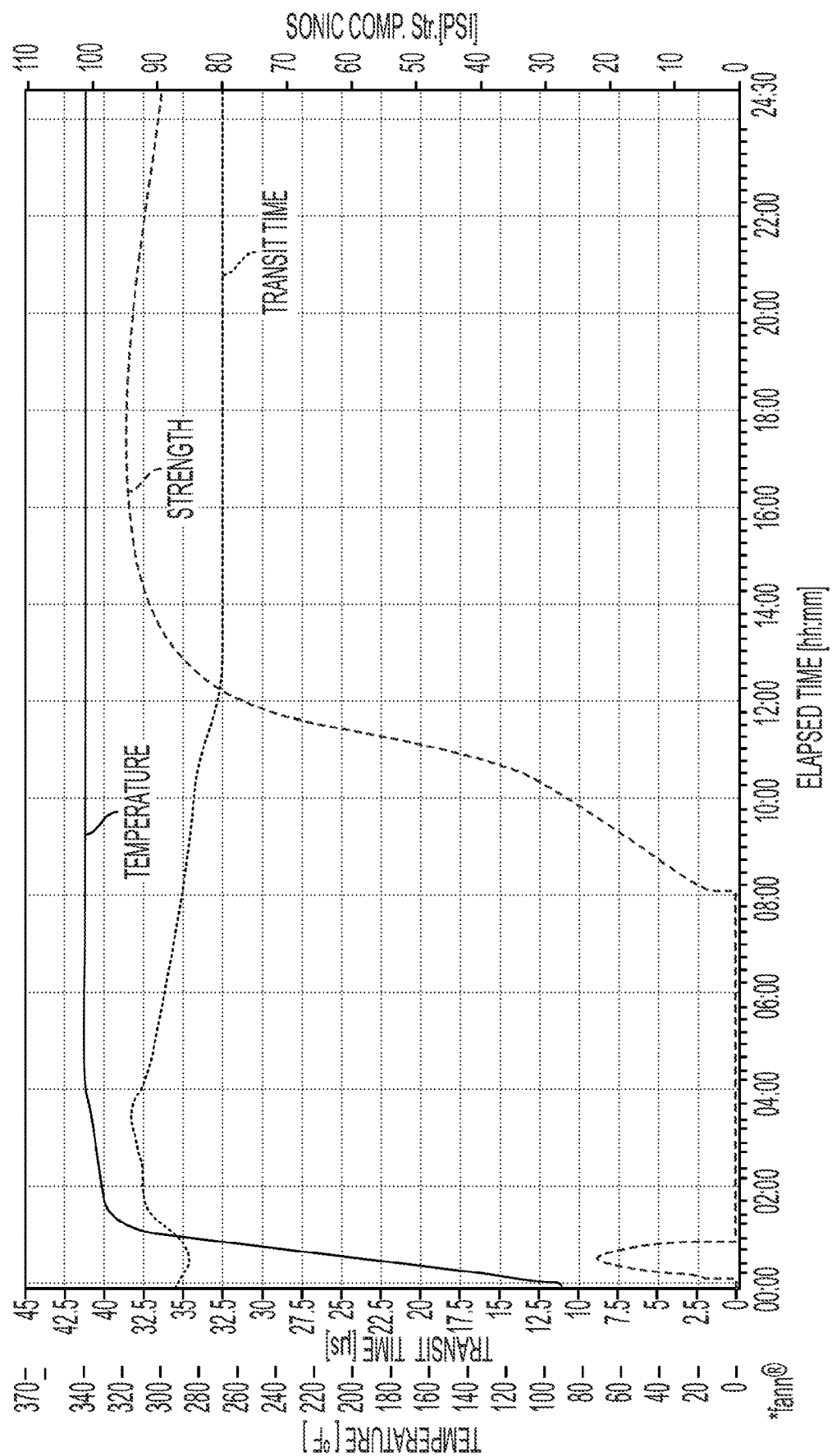
FIG. 5 is a chart of compressive strength with respect to temperature and sonic transit time of a comparative plugging material.

The slurries were also tested for properties indicative of in-field performance. The compressive strength (at 340° F.) result as determined by an ultrasonic cement analyzer according to method API RP 10B-2 for Slurry 1 is provided in FIG. 4. The compressive strength for Slurry 2 is provided in FIG. 5. Slurry 1, with crosslinked polysaccharides, achieved 50 psi several hours before Slurry 2. Slurry 1 progressed to a strength of 100 psi and ultimately reached a strength of 132 psi at twenty-four hours. Slurry 2 did not achieve 100 psi, even after twenty-four hours.

Figure 6:
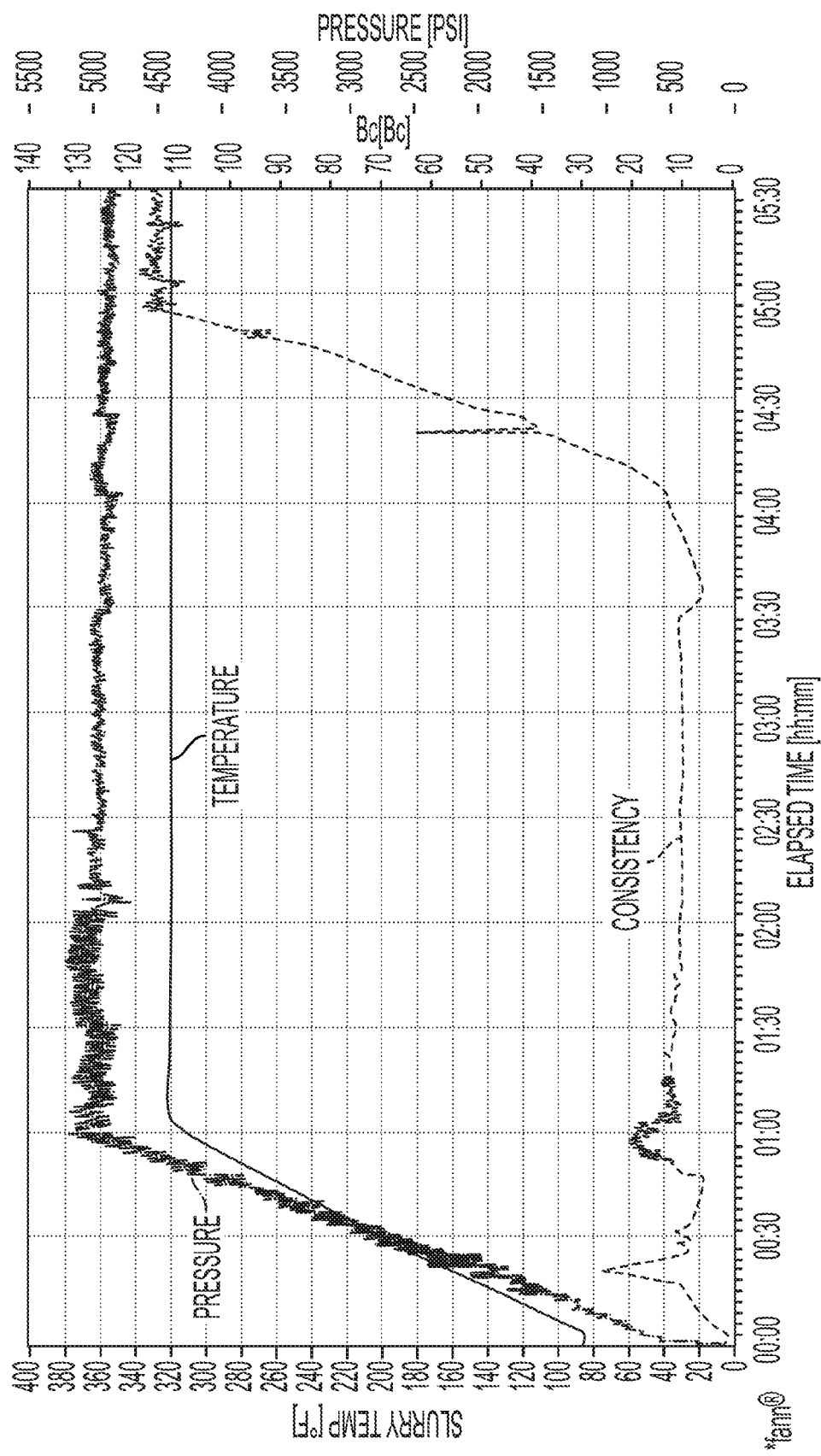
FIG. 6 is a chart of consistency with respect to temperature and pressure of a plugging material according to one example of the present disclosure.
Figure 7:
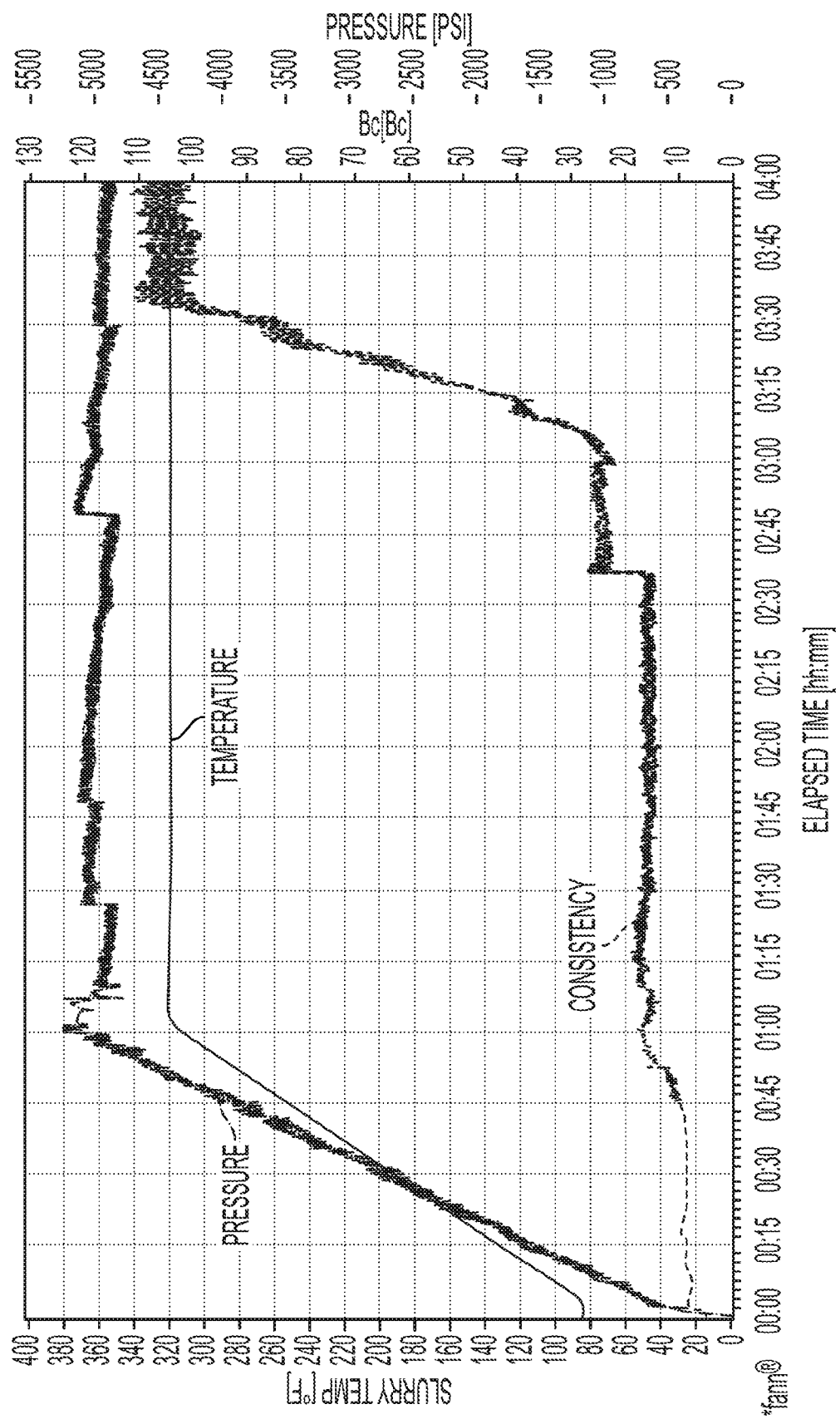
FIG. 7 is a chart of consistency with respect to temperature and pressure of a comparative plugging material.

The results for thickening time (at 320° F. and 5000 psi) according to method API RP 10B-2 for Slurry 1 are provided in FIG. 6. The thickening time of Slurry 2 is provided in FIG. 7. The endpoint for thickening time was considered to be 70 Bc (Bearden units of consistency). Slurry 1, with crosslinked polysaccharides, was slower than Slurry 2 to achieve a consistency of 70 Bc at downhole conditions of 320° F. and 5000 psi.

Figure 8:
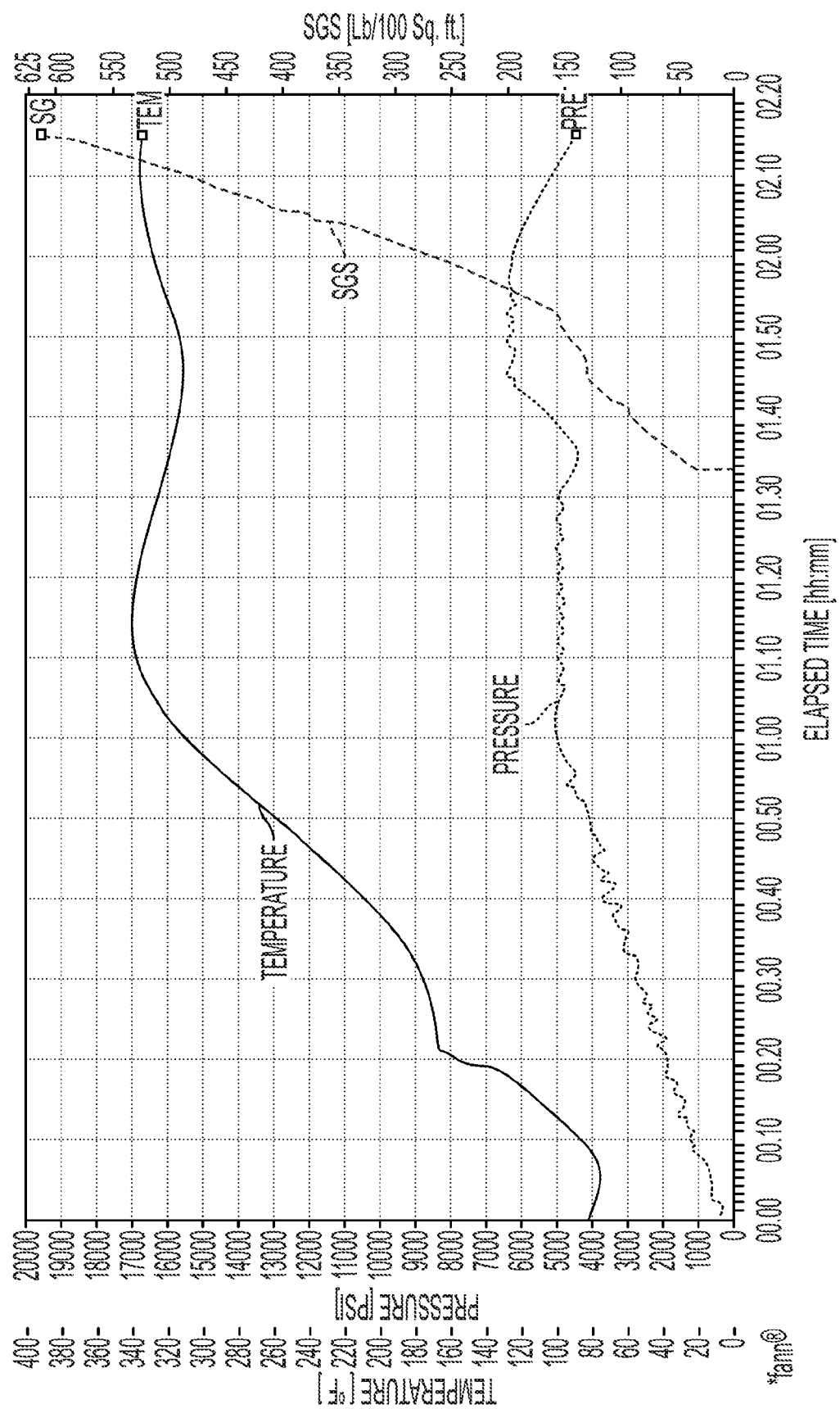
FIG. 8 is a chart of static gel strength with respect to temperature and pressure of a plugging material, according to one example of the present disclosure.
Figure 9:
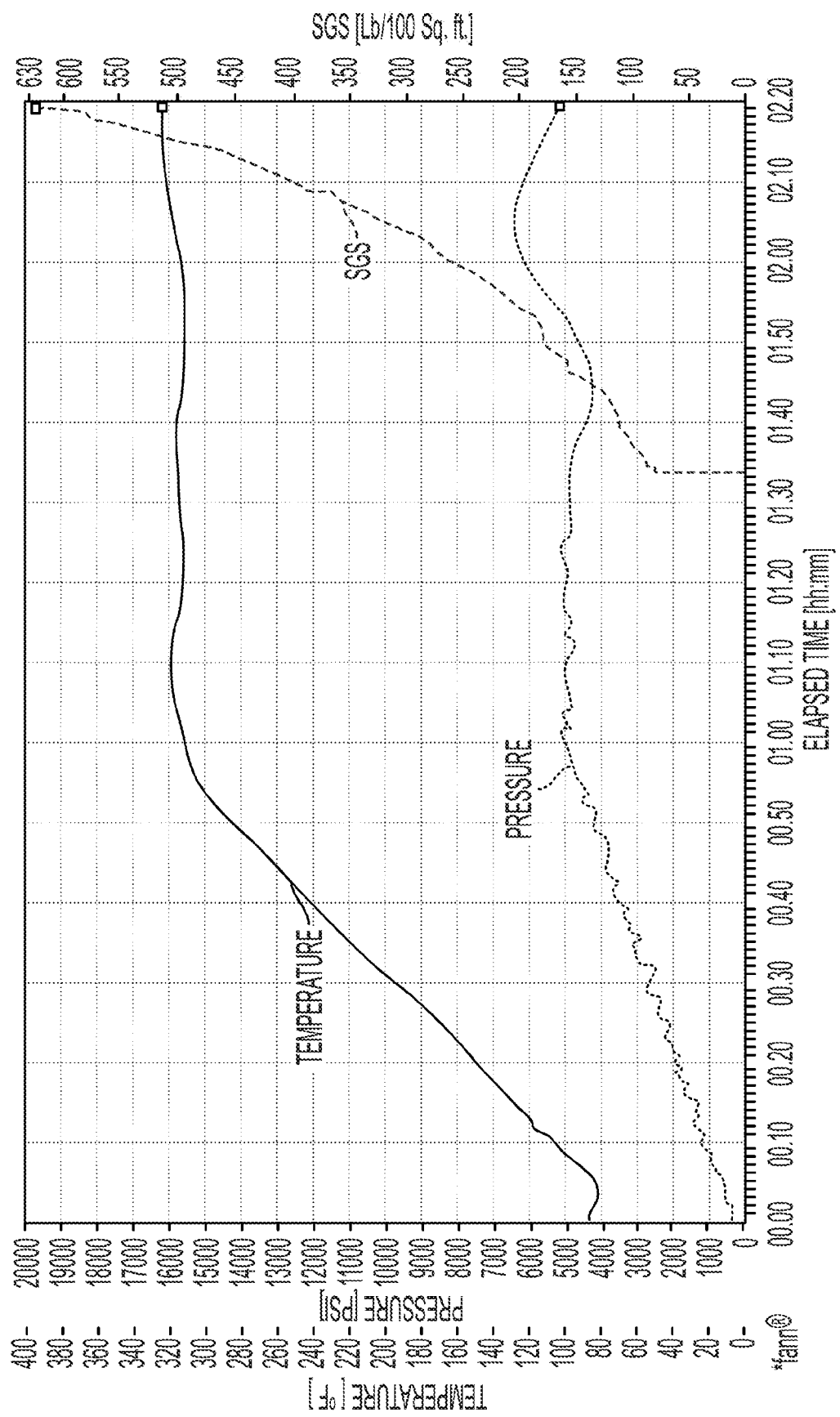
FIG. 9 is a chart of static gel strength with respect to temperature and pressure of a comparative plugging material.

The results of static gel strength (at 320° F. and 5000 psi) as determined by the time required to transition from 100 lbf/100 ft² to 500 lbf/100 ft² for Slurry 1 are provided in FIG. 8. The static gel strength of Slurry 2 is provided in FIG. 9. Slurry 1, with crosslinked polysaccharides, built gel strength faster than Slurry 2. Slurry 1 progressed from 100 to 500 lbf/100 ft² ten minutes faster than Slurry 2, even though the thickening time for Slurry 2 was less than that for Slurry 1. Tables 3 summarizes the performance tests of Slurries 1 and 2.

TABLE 3

| Slurry | Thickening time (hr:min) | UCA Compressive Strength | | | Transition Time (min) |
|---|---|---|---|---|---|
| | | 50 psi (hr:min) | 100 psi (hr:min) | 24 hr. (psi) | |
| 1 | 04:37 | 04:44 | 06:41 | 132 | 30 |
| 2 | 03:23 | 11:07 | — | 90 | 40 |

Example 2

Two batches of LCM slurry were prepared, each with a different retarder. The components listed in Table 4 were mixed using the on-the-fly method described in FIG. 2, where the dry blend included the first 3 components. All slurries included Suspend HT™, an additive with polysaccharides crosslinked with borate.

TABLE 4

| Component | Unit | Slurry 3 | Slurry 4 |
|---|---|---|---|
| Class G Cement | % bwoc | 100 | 100 |
| SSA-1 ™ (stabilizing agent) | % bwoc | 35 | 35 |
| Silicalite ™ (amorphous silica) | % bwoc | 5 | 5 |
| Silicalite ™ liquid (extender) | gal/sk | 2 | 2 |
| Suspend HT ™ (polysaccharide additive) | % bwoc | 3 | 3 |
| SCR-724L ™ Cement Retarder | gal/sk | 0.5 | — |
| HR ®-14LM Cement Retarder | gal/sk | — | 0.5 |
| Econolite ™ Liquid (accelerator) | gal/sk | 0.13 | 0.13 |
| FDP-984 (clay) | % bwow | 1 | 1 |
| Water | gal/sk | 34 | 34 |
| D-Air 3000L ™ (defoamer) | gal/sk | 0.1 | 0.1 |
| NaOH | % bwow | 0.3 | 0.3 |

The slurries were tested for rheological behavior and gel strength using a FANN® rheometer using a Fann Yield Stress Adapter (FYSA). All tests were performed using API RP 10B-2. The test results are summarized in Table 5.

TABLE 5

| Rheology on FYSA | Slurry 3 80° F. | Slurry 3 180° F. | Slurry 4 80° F. | Slurry 4 180° F. |
|---|---|---|---|---|
| 300 | 12 | 10 | 15 | 17 |
| 200 | 9 | 6 | 14 | 14 |
| 100 | 8 | 4 | 13 | 12 |
| 6 | 7 | 2 | 12 | 9 |
| 3 | 7 | 2 | 12 | 10 |
| 10-sec. gel strength (lbf/100 ft²) | 11 | 6 | 14 | 13 |
| 10-min gel strength (lbf/100 ft²) | 35 | 14 | 27 | 27 |

The 10-minute gel strength of Slurry 3 and Slurry 4 at 80° F. were similar to each other.

Figure 10:
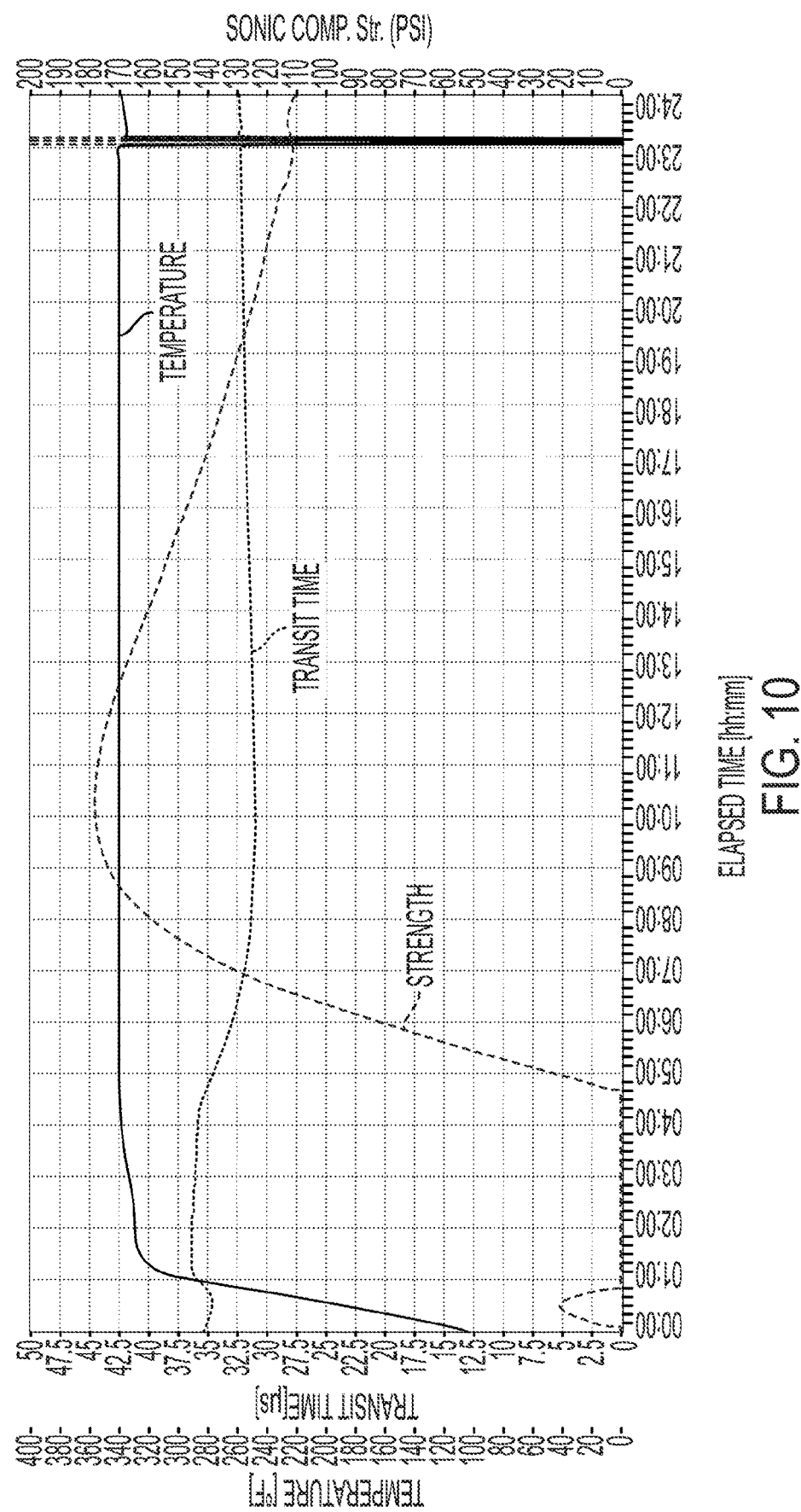
FIG. 10 is a chart of compressive strength with respect to temperature and sonic transit time of a plugging material, according to one example of the present disclosure.
Figure 11:
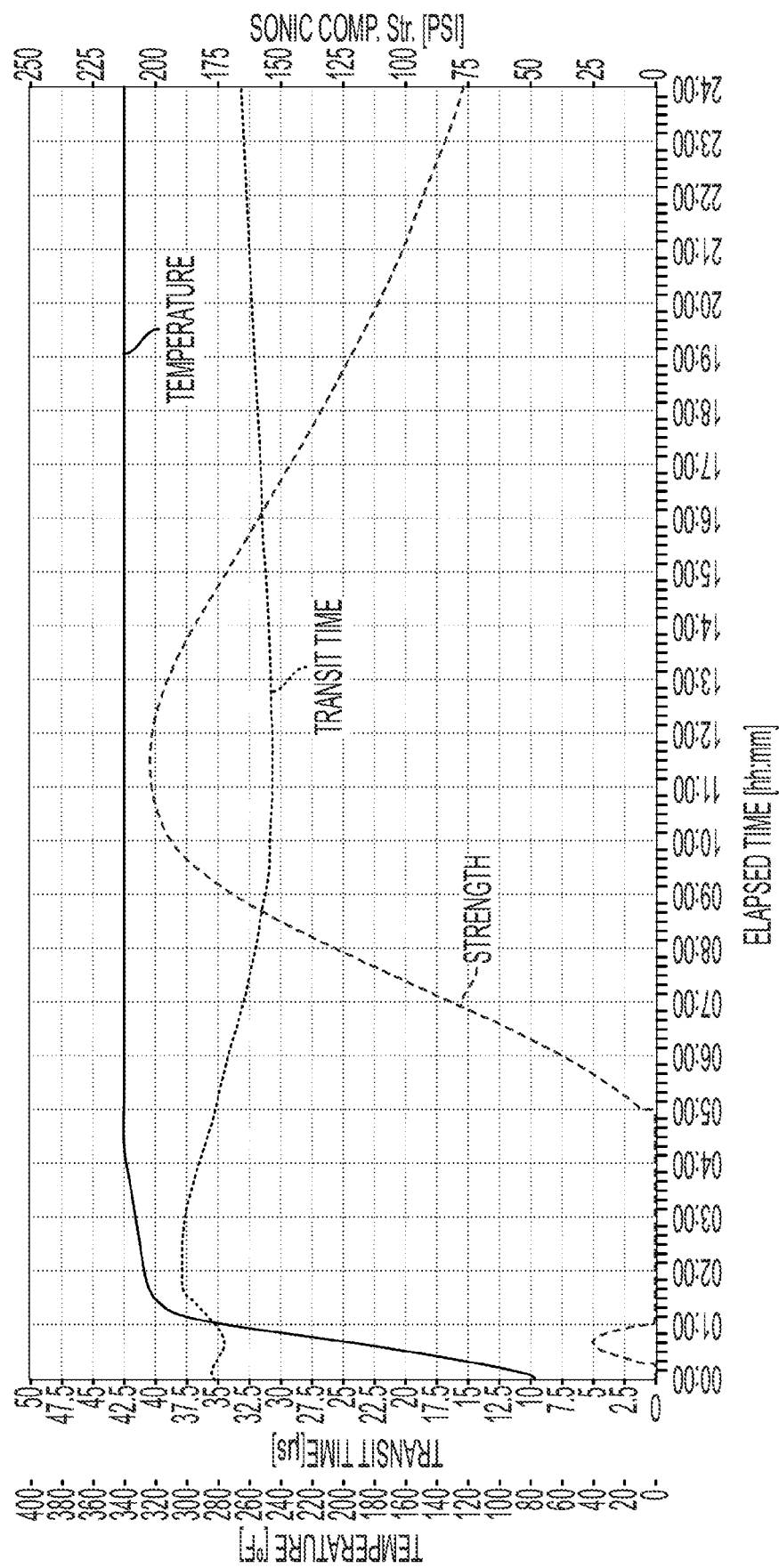
FIG. 11 is a chart of compressive strength with respect to temperature and sonic transit time of a plugging material, according to one example of the present disclosure.

The slurries were also tested for properties indicative of in-field performance. The results of compressive strength (at 340° F.) as determined by an ultrasonic cement analyzer for Slurry 3 is provided in FIG. 10, and the compressive strength for Slurry 4 is provided in FIG. 11. Slurry 3 and Slurry 4 each developed early compressive strength, with both achieving 100 psi in less than eight hours.

Figure 12:
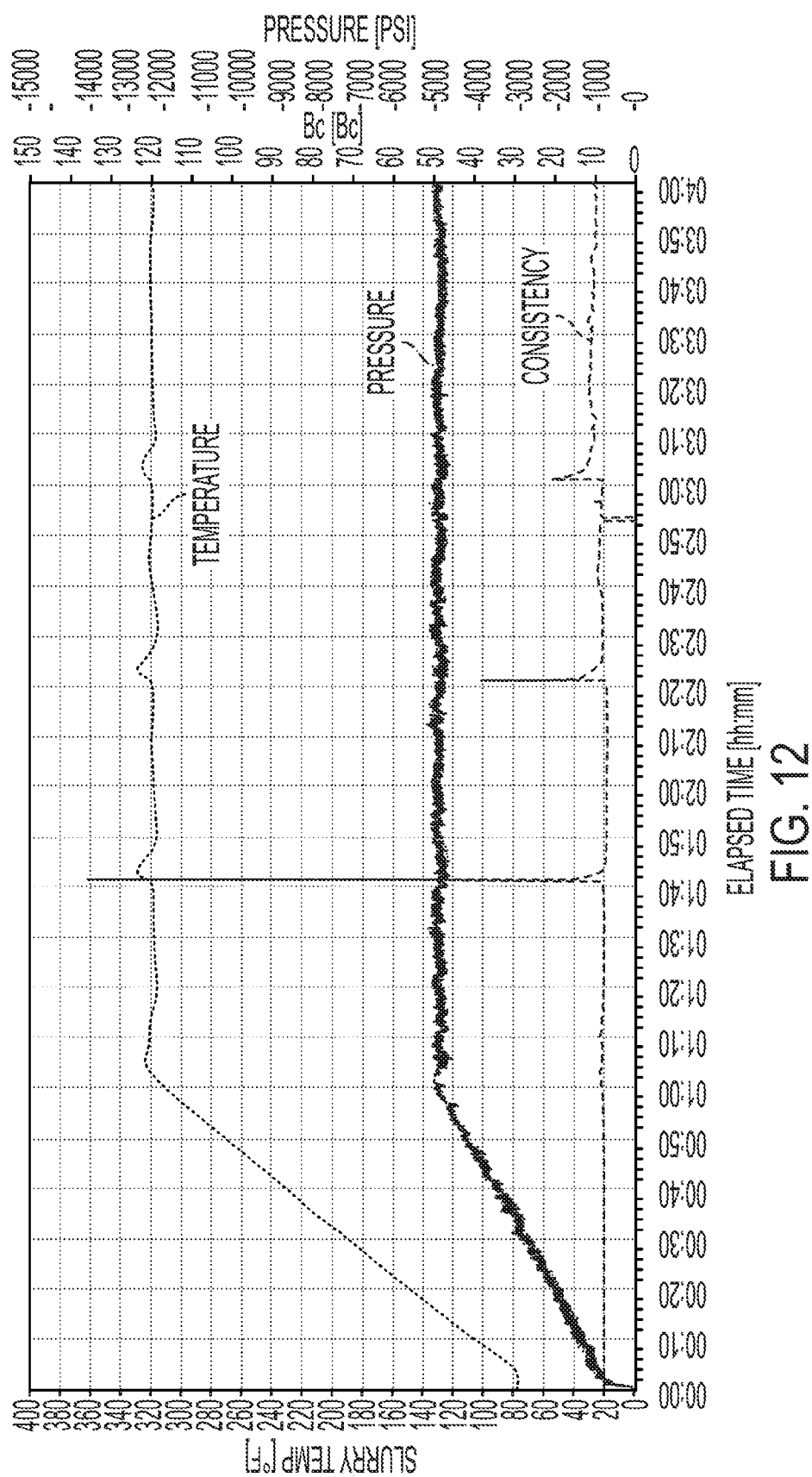
FIG. 12 is a chart of consistency with respect to temperature and pressure of a plugging material according to one example of the present disclosure.
Figure 13:
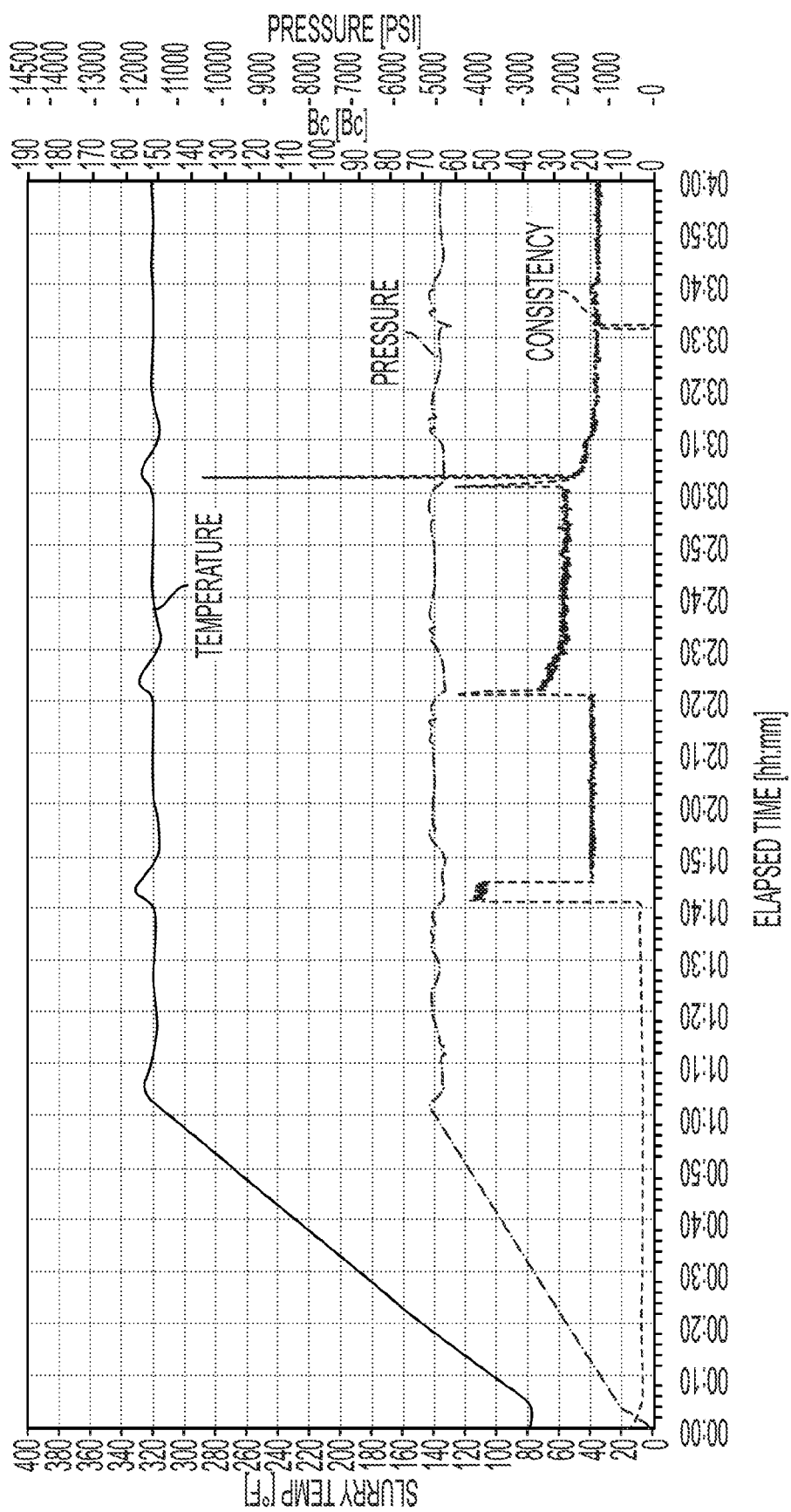
FIG. 13 is a chart of consistency with respect to temperature and pressure of a plugging material according to one example of the present disclosure.

The results for thickening time (at 320° F. and 5000 psi) for Slurry 3 are provided in FIG. 12. The thickening time of Slurry 4 is provided in FIG. 13. The endpoint for thickening time was considered to be 70 Bc (Bearden units of consistency) after shear conditions were on-off-on. Slurry 3 and Slurry 4 both showed thickening time greater than six hours at downhole conditions of 320° F. and 5000 psi.

Figure 14:
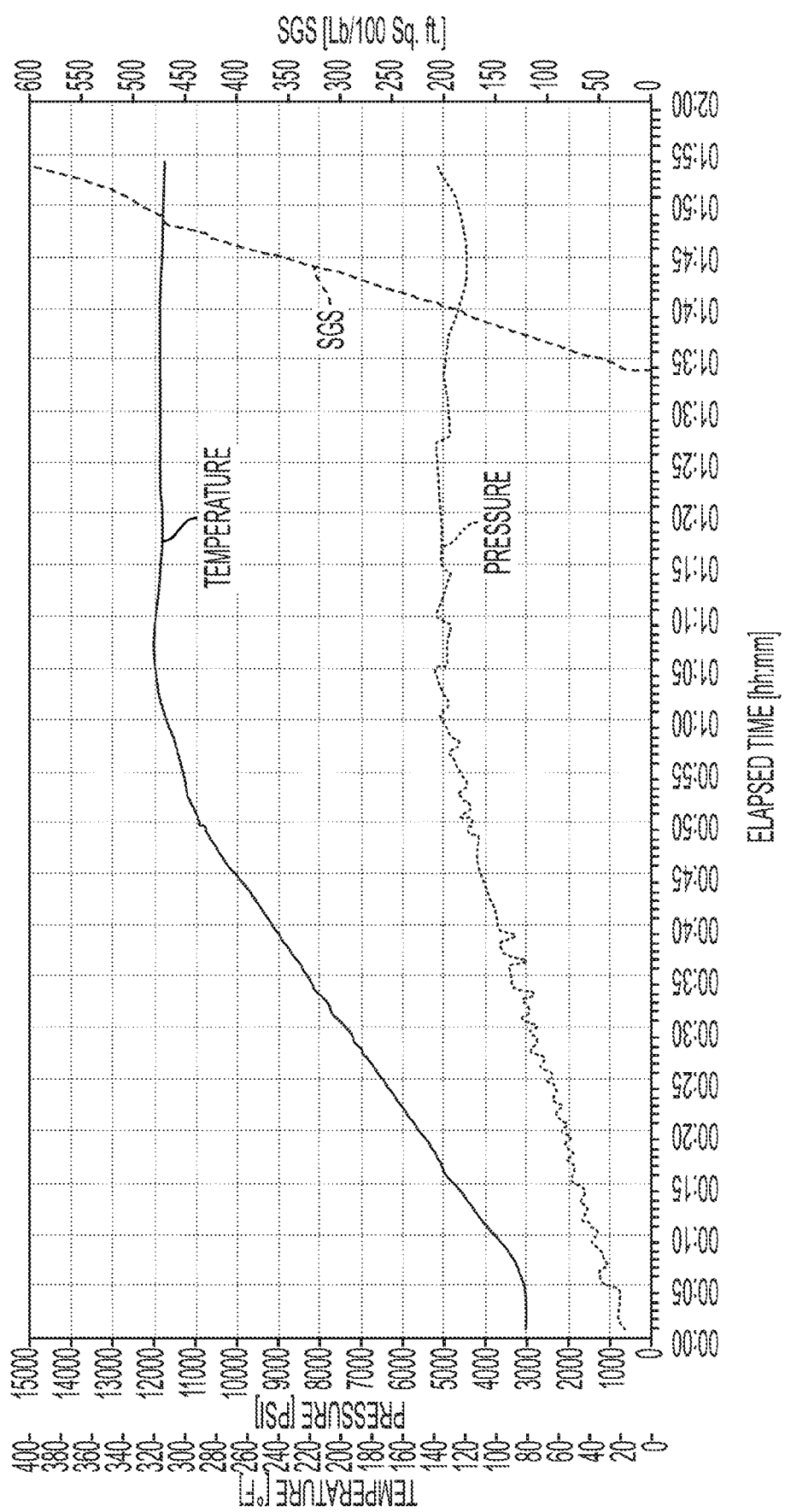
FIG. 14 is a chart of static gel strength with respect to temperature and pressure of a plugging material, according to one example of the present disclosure.
Figure 15:
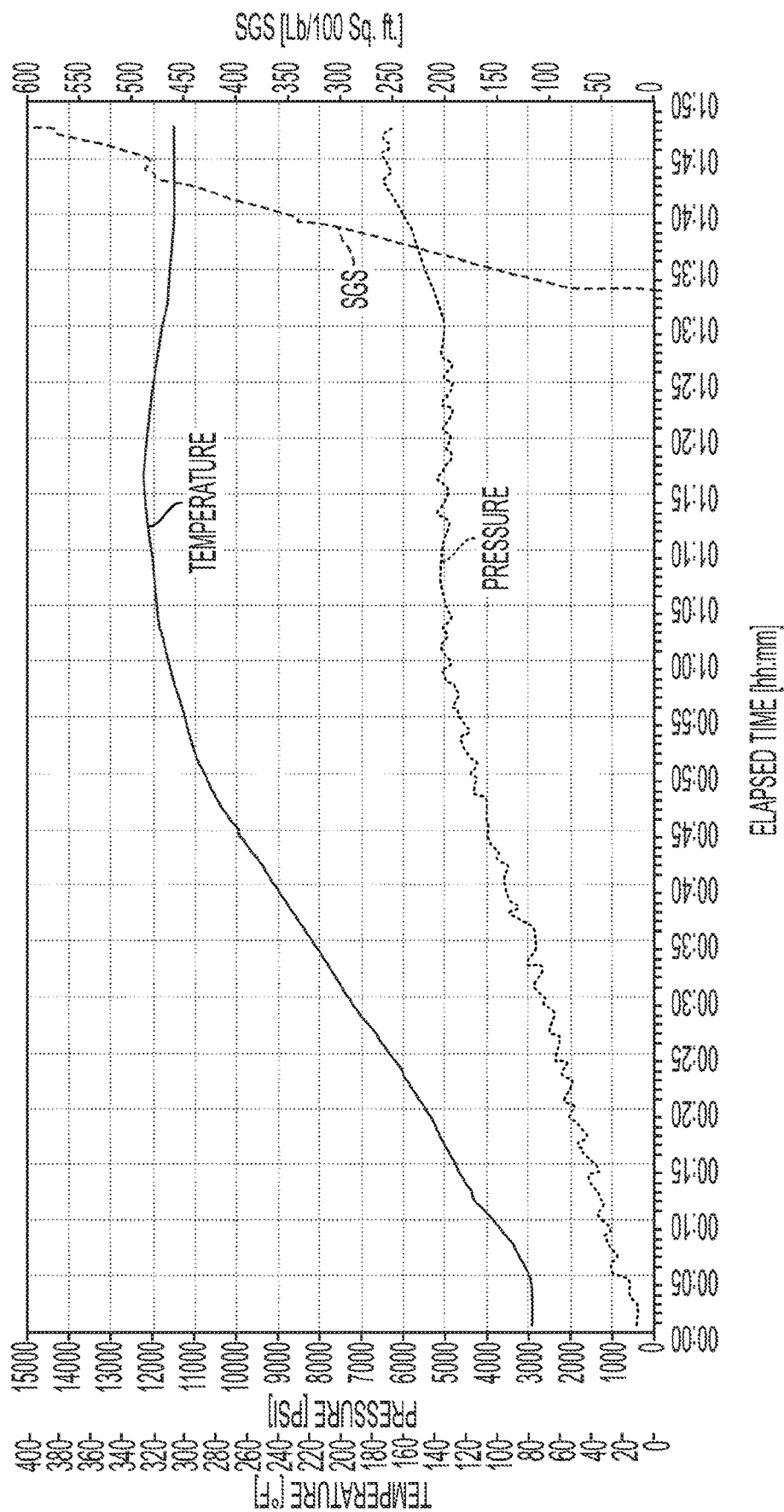
FIG. 15 is a chart of static gel strength with respect to temperature and pressure of a plugging material, according to one example of the present disclosure.

The results of static gel strength (at 320° F. and 5000 psi) as determined by the time required to transition from 100 lbf/100 ft² to 500 lbf/100 ft² for Slurry 3 are provided in FIG. 14. The static gel strength of Slurry 4 is provided in FIG. 15. Slurry 3 and Slurry 4 both provided rapid gel strength. Slurry 4 built gel strength faster than Slurry 3. Slurry 4 progressed from 100 to 500 lbf/100 ft² three minutes faster than Slurry 3, Tables 6 summarizes the performance tests of Slurries 3, and 4.

TABLE 6

| Slurry | Thickening time (hr:min) | UCA Strength 50 psi (hr:min) | Compressive 100 psi (hr:min) | Transition Time | |
|---|---|---|---|---|---|
| | | | | Time for 0 to 100 lbf/ 100 ft² (min) | Time for 100 to 500 lbf/ 100 ft² (min) |
| 3 | >6 | 05:27 | 06:21 | 7 | 14 |
| 4 | >6 | 06:19 | 07:24 | 4 | 11 |

Illustrative Embodiments of Suitable Materials and Methods.

As used below, any reference to methods, materials, or systems is understood as a reference to each of those methods, materials, or systems disjunctively (e.g., "Illustrative embodiment 1-4 is understood as illustrative embodiment 1, 2, 3, or 4.").

Illustrative embodiment 1 is a plugging material comprising hydraulic cement, amorphous silica, polysaccharides, a retarder, clay, and an aqueous base, the material being injectable into a wellbore.

Illustrative embodiment 2 is the material of any preceding or subsequent illustrative embodiment, wherein the polysaccharides are cross-linked.

Illustrative embodiment 3 is the material of any preceding or subsequent illustrative embodiment, wherein the retarder comprises at least one of an organo phosphoric acid, a modified sulfonated styrene-maleic anhydride polymer, lignosulfonate, or a polyacrylic acid.

Illustrative embodiment 4 is the material of any preceding or subsequent illustrative embodiment, further comprising at least one of a resin, a latex, a stabilizer, a pozzolan, a microsphere, an aqueous superabsorber, a viscosifying agent, a suspending agent, a dispersing agent, an extender, a salt, an accelerant, a surfactant, a stimulating agent, a defoamer, a settling-prevention agent, a weighting material, an elastomer, a vitrified shale, an expansion additive, a gas migration control additives a formation conditioning agent, an acid, or and a base.

Illustrative embodiment 5 is the material of any preceding or subsequent illustrative embodiment, wherein the hydraulic cement comprises at least one of Portland cement, a pozzolana cement, a gypsum cement, a high alumina content cement, a slag cement, a high magnesia content cement, a shale cement, an acid or a base cement, a fly ash cement, a zeolite cement system, a kiln dust cement system, a microfine cement, a metakaolin, or a pumice.

Illustrative embodiment 6 is the material of any preceding or subsequent illustrative embodiment, wherein the aqueous base comprises at least one of fresh water, brackish water, or saltwater.

Illustrative embodiment 7 is the material of any preceding or subsequent illustrative embodiment, wherein the pH of the aqueous base is adjusted with sodium hydroxide.

Illustrative embodiment 8 is the material of any preceding or subsequent illustrative embodiment, wherein the material has a density of less than about 12 pounds per gallon.

Illustrative embodiment 9 is the material of any preceding or subsequent illustrative embodiment, wherein the material has a thickening time to 70 Bc at 320° F. and 5000 psi of at least two hours.

Illustrative embodiment 10 is the material of any preceding or subsequent illustrative embodiment, wherein the material has a 10-second static gel strength of at least 6 lbf/100 ft$^2$ at 180° F., and a 10-minute static gel strength of at least 14 lbf/100 ft$^2$ at 180° F.

Illustrative embodiment 11 is the material of any preceding or subsequent illustrative embodiment, wherein the material has a 10-second static gel strength of at least 15 lbf/100 ft$^2$ at 180° F., and a 10-minute static gel strength of at least 45 lbf/100 ft$^2$ at 180° F.

Illustrative embodiment 12 is the material of any preceding or subsequent illustrative embodiment, wherein the material has an ultimate compressive strength over 100 psi at 340° F.

Illustrative embodiment 13 is the material of any preceding or subsequent illustrative embodiment, wherein the material transitions from 100 lbf/100 ft$^2$ to 500 lbf/100 ft$^2$ in 30 minutes or less, at 320° F. and 5000 psi.

Illustrative embodiment 14 is the material of any preceding or subsequent illustrative embodiment, wherein the polysaccharides are present in an amount of about 1 percent by weight of concrete to about 10 percent by weight of concrete.

Illustrative embodiment 15 is the material of any preceding or subsequent illustrative embodiment, wherein the retarder is present in an amount of about 2 percent by weight of concrete to about 15 percent by weight of concrete.

Illustrative embodiment 16 is the material of any preceding or subsequent illustrative embodiment, wherein the material is positionable in the wellbore to substantially seal one or more permeable zones in the wellbore, and prevent a loss of circulation of drilling fluids and cement slurries through the permeable zones.

Illustrative embodiment 17 is a method comprising providing a material comprising hydraulic cement, amorphous silica, polysaccharides, a retarder, clay, and an aqueous base; contacting a lost circulation zone in a wellbore with the material; and allowing the material to set in the lost circulation zone.

Illustrative embodiment 18 is the method of any preceding or subsequent illustrative embodiment, wherein the retarder comprises at least one of an organo phosphoric acid, a modified sulfonated styrene-maleic anhydride polymer, lignosulfonate, or a polyacrylic acid.

Illustrative embodiment 19 is the method of any preceding or subsequent illustrative embodiment, wherein the material has a thickening time to 70 Bc at 320° F. and 5000 psi of at least two hours.

Illustrative embodiment 20 is the method of any preceding or subsequent illustrative embodiment, wherein the material has a 10-second static gel strength of at least 6 lbf/100 ft$^2$ at 180° F., and a 10-minute static gel strength of at least 14 lbf/100 ft$^2$ at 180° F.

Definitions and Descriptions

The terms "disclosure," "the disclosure," "the present disclosure," "embodiment," "certain embodiment" and the like are used herein are intended to refer broadly to all the subject matter of this patent application and the claims below. Statements containing these terms should be understood not to limit the subject matter described herein or to limit the meaning or scope of the patent claims below. The terms "comprising," "having," "including," and "containing" are to be construed as open-ended terms (i.e., meaning "including, but not limited to") unless otherwise noted. It is further noted that, as used in this specification, the singular forms "a," "an," and "the" include plural referents unless expressly and unequivocally limited to one referent.

Notwithstanding that the numerical ranges and parameters setting forth the broad scope of the present disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more, e.g. 1 to 6.1, and ending with a maximum value of 10 or less, e.g., 5.5 to 10. Additionally, any reference referred to as being "incorporated herein" is to be understood as being incorporated in its entirety.

Various embodiments of the present disclosure have been described herein. It should be recognized that these embodiments are merely illustrative of the present disclosure. Variations of those preferred embodiments may become apparent to those of ordinary skill in the art upon reading the foregoing description. The inventors expect skilled artisans to employ such variations as appropriate, and the inventors intend for the present disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the present disclosure unless otherwise indicated or otherwise clearly contradicted by context.

It is to be understood that the present description illustrates aspects of the disclosure relevant to a clear understanding of the present disclosure. Certain aspects of the disclosure that would be apparent to those of ordinary skill in the art and that, therefore, would not facilitate a better understanding of the disclosure have not been presented in order to simplify the present description. Although the present disclosure has been described in connection with certain embodiments, the present disclosure is not limited to the particular embodiments disclosed, but is intended to cover modifications that are within the spirit and scope of the disclosure.

What is claimed is:

1. A plugging material comprising:
   hydraulic cement,
   amorphous silica,
   polysaccharides cross-linked with borate,
   a retarder,
   clay, and
   an aqueous base, the material being injectable into a wellbore, wherein the polysaccharides cross-linked with borate break down at temperatures above 160° F. after injection into the wellbore to release freed borate that increases gel strength and thickening time of the hydraulic cement in the plugging material.

2. The material of claim 1, wherein the polysaccharides are cross-linked.

3. The material of claim 1, wherein the retarder comprises a modified sulfonated styrene-maleic anhydride polymer.

4. The material of claim 1, further comprising at least one of a resin, a latex, a stabilizer, a pozzolan, a microsphere, an aqueous superabsorber, a viscosifying agent, a suspending agent, a dispersing agent, an extender, a salt, an accelerant, a surfactant, a stimulating agent, a defoamer, a settling-prevention agent, a weighting material, an elastomer, a vitrified shale, an expansion additive, a gas migration control additives a formation conditioning agent, an acid, or and a base.

5. The material of claim 1, wherein the hydraulic cement comprises at least one of Portland cement, a pozzolana cement, a gypsum cement, a high alumina content cement, a slag cement, a high magnesia content cement, a shale cement, an acid or a base cement, a fly ash cement, a zeolite cement system, a kiln dust cement system, a microfine cement, a metakaolin, or a pumice.

6. The material of claim 1, wherein the aqueous base comprises at least one of fresh water, brackish water, or saltwater.

7. The material of claim 1, wherein the pH of the aqueous base is adjusted with sodium hydroxide.

8. The material of claim 1, wherein the material has a density of less than about 12 pounds per gallon.

9. The material of claim 1, wherein the thickening time to 70 Bc at 320° F. and 5000 psi is increased to at least two hours.

10. The material of claim 1, wherein the material has a 10-second static gel strength of at least 6 lbf/100 ft$^2$ at 180° F., and a 10-minute static gel strength of at least 14 lbf/100 ft$^2$ at 180° F.

11. The material of claim 1, wherein the material has a 10-second static gel strength of at least 15 lbf/100 ft$^2$ at 180° F., and a 10-minute static gel strength of at least 45 lbf/100 ft$^2$ at 180° F.

12. The material of claim 1, wherein the material has an ultimate compressive strength over 100 psi at 340° F.

13. The material of claim 1, wherein the material transitions from 100 lbf/100 ft$^2$ to 500 lbf/100 ft$^2$ in 30 minutes or less, at 320° F. and 5000 psi.

14. The material of claim 1, wherein the polysaccharides are present in an amount of about 1 percent by weight of cement to about 10 percent by weight of cement.

15. The material of claim 1, wherein the retarder is present in an amount of about 7 percent by weight of cement to about 15 percent by weight of cement.

16. The material of claim 1, wherein the material is positionable in the wellbore to substantially seal one or more permeable zones in the wellbore, and prevent a loss of circulation of drilling fluids and cement slurries through the permeable zones.

17. A method comprising:
   providing a material comprising hydraulic cement, amorphous silica, polysaccharides cross-linked with borate, a retarder, clay, and an aqueous base;
   contacting a lost circulation zone in a wellbore with the material, and
   allowing the material to set in the lost circulation zone, wherein the polysaccharides cross-linked with borate break down at temperatures above 160° F. after injection into the wellbore to release freed borate that increases gel strength and thickening time of the hydraulic cement in the material.

18. The method of claim 17, wherein the retarder comprises a modified sulfonated styrene-maleic anhydride polymer.

19. The method of claim 17, wherein the thickening time to 70 Bc at 320° F. and 5000 psi is increased to at least two hours.

20. The method of claim 17, wherein the material has a 10-second static gel strength of at least 6 lbf/100 ft$^2$ at 180° F., and a 10-minute static gel strength of at least 14 lbf/100 ft$^2$ at 180° F.

* * * * *